United States Patent Office 3,806,414
Patented Apr. 23, 1974

3,806,414
PROCESS FOR PRODUCING CITRIC ACID
BY FERMENTATION
Kazuo Kimura, Kenichiro Takayama, and Toru Nakanishi, Tokyo, Japan, assignors to Kyowa Hakko Kogyo Co., Ltd., Tokyo, Japan
No Drawing. Filed Nov. 9, 1971, Ser. No. 197,149
Claims priority, application Japan, Nov. 25, 1970, 45/103,286
Int. Cl. C12b 1/00
U.S. Cl. 195—28 R  9 Claims

ABSTRACT OF THE DISCLOSURE

A process for producing citric acid by fermentation which comprises culturing a citric acid-producing microorganism belonging to *Candida guilliermondii* subps. *galactosa* in an aqueous nutrient medium containing a carbon source, and recovering citric acid from the resulting culture liquor.

---

This invention relates to a process for producing citric acid. More particularly, this invention relates to a process for producing citric acid by fermentation with a microorganism capable of producing citric acid belonging to *Candida guilliermondii* subsp. *galactosa*.

In regard to the production of citric acid by fermentation, a method based on the use of mold fungi such as *Aspergillus niger*, etc., is well known, and recently a method based on the use of bacteria or yeasts has been reported. The method for producing citric acid by yeast, reported by Tabuchi, Abe and others [Nihon Nogei Kagaku Kaishi 42,440 (1968); Nihon Nogei Kagaku Kai Koen Yoshi-shu, page 183 (1969)], is interesting by reason that in this method, the fermentation time is short, fermentation yield is high, and not only saccharine material, but also n-paraffin, etc. can be utilized as a carbon source. However, this known process has a great disadvantage that isocitric acid, which is difficult to separate by fractionation is produced as a product in addition to the citric acid. Therefore, in order to produce only citric acid by this method, very complicated steps such as complete removal of iron ion from the culture medium and the addition of a chemical, for example, monofluoroacetic acid, capable of changing the quantitative proportion of the fermentation products, are necessary.

As a result of wide searches in the natural field for yeasts capable of producing citric acid, the present inventors have found a novel yeast having a high citric acid productivity, which is almost or completely incapable of producing isocitric acid in a nutrient medium.

The strain used in the present invention is a variant of *Candida guilliermondii*. The preferred strain is *Candida guilliermondii subsp. galactosa* nov subsp. No. 610 (ATCC 20296).

In producing citric acid by fermentation with the present yeast in accordance with this invention, it is not necessary to control iron ion in the medium or add a special chemical thereto. Therefore, it is possible to use a relatively cheap raw fermentation material.

Further, the present yeast has a good hydrocarbon assimilability, therefore, such hydrocarbons as n-paraffin, and the like can be used as a carbon source in the fermentation process.

The analysis on the enzymatic activities of the present yeast has revealed that the yeast has a remarkably higher isocitric acid dehydrogenase activity (the enzyme number 1.1.1.41) compared with other yeast. This activity is believed to enhance the productivity of citric acid. For example, the activity of isocitrate dehydrogenase (the enzyme number 1.1.1.41) of *Candida zeylanoides* var. No. 2265 ATCC 15585 is $3.20 \times 10$ u./mg. protein and that of the present yeast is $6.12 \times$ u./mg. protein.

The present yeast was tested for microbiological characteristics and identified according to J. Lodder and N.J.W. Kreger-Van Riji: "The Yeasts, a Taxonomic Study" (1952).

The present yeast strain is identical with *Candida guilliermondii* and *Candida guilliermondii* var. *membranaefaciens* cited in "*The Yeasts, a Taxonomic Study*" except for the following characteristics:

(1) The present strain is capable of fermenting galactose at an ordinary rate, and (2) decomposing arbutin very weakly.

Furthermore, in the study of strain No. 610, the following facts were newly observed by the present inventors:

(1) The strain is negative in urease activity.

(2) requires thiamine for growth, (3) is capable of assimilating n-paraffins, (4) accumulates a considerable amount of citric acid, of which the production ratio to isocitric acid is remarkably high compared with that of other n-paraffin-assimilable yeasts, and (5) has a higher activity of isocitric acid dehydrogenase (the enzyme number 1.1.1.41) compared with other n-paraffin-assimilable yeasts.

The No. 610 strain readily forms a membrane when grown with ethanol, therefore, the strain was presumed to be akin to *Canadida guilliermondii* var. *membranefaciens*. However, in view of the above-mentioned differences or characteristics, the strain was identified to belong to a new subspecies of *Candida guilliermondii*, and the nef subspecies was names as *Candida guilliermondii* subsp. *galactosa*.

Fermentation of the yeast strain of the present invention is conducted in an aqueous nutrient medium containing a carbon source which includes one or more carbon-hydrates, hydrocarbons and/or other organic substances. The carbohydrates include various sugars and sugar alcohols; such as glucose, fructose, maltose, sucrose, molasses, starch, starch hydrolysate and the like. A single hydrocarbon or a mixture of various liquid, gaseous or solid hydrocarbons may be used as the main carbon source. Exemplary of these hydrocarbons are paraffins such as straight and branched chain hydrocarbons containing from 5 to 20 carbon atoms, and mixed hydrocarbons such as gas, oil, light oil, kerosene, crude oil and the like. The other suitable organic substances include alcohols such as glycerol, mannitol and sorbitol and organic acids, such as acetic acid.

As the nitrogen source, various organic and inorganic nitrogen compounds can be used such as ammonium, chloride, ammonium sulfate, ammonium nitrate, urea, peptone, yeast extract, meat extract, corn steep liquor, bouillon, fish meal, casein hydrolysates, etc. Also, it is often desired to add a nutrient factor such as vitamins, e.g. thiamine, biotin, pantothenic acid, etc.; amino acids, e.g. histidine, tyrosine, phenylalanine, threonine, leucine, cystine, etc.; or an organic nitrogen source containing the said substances. Furthermore, it is also effective to add a trace of metal salt, that is, iron sulfate, zinc sulfate, copper sulfate, molybdenate, calcium salt, or borate to the medium.

Fermentation or culturing of the yeast strain is carried out under aerobic conditions, e.g. by aerobic shaking of the culture or by stirring and aeration of a submerged culture, at a temperature of about 20° to about 40° C., preferably at about 30° C. The fermentation proceeds at a pH of about 1.0 to about 9.0 and most favorabaly at a pH of about 6.0. Often pH regulators such as calcium carbonate, caustic soda, calcium hydroxide, ammonia or the like are added during the course of the culturing to maintain the desired pH level.

Upon completion of the desired degree of culturing, citric acid may be recovered from the resulting culture liquor by various conventional techniques including ion exchange treatment, solvent extraction, precipitation, crystallization, centrifugation, adsorption, and the like.

The following examples are illustrative of the present invention and should not be considered as limiting. Unless otherwise noted, all percentages are by weight per volume.

EXAMPLE 1

*Candida guilliermondii* subsp. *galactosa* No. 610 (ATCC 20296) cultured for 24 hours in a yeast bouillon medium was inoculated in the amount of 10% by volume into a 500-ml. Sakaguchi flask containing 50 ml. of an aqueous nutrient medium containing 8% molasses, 0.3% $NH_4Cl$, 0.05% $KH_2PO_4$, 0.02% $MgSO_4 \cdot 7H_2O$, and 4% $CaCO_3$ and having a pH of 6.0, and cultured at 30° C. for 3 days with aerobic shaking (130 reciprocations per minute), whereby 41 mg./ml. of calcium citrate (calculated as citric acid) was formed at the end of fermentation. In that case, only 2 mg./ml. of the corresponding salt of isocitric acid (calculated as isocitric acid) was formed. After the calcium citrate was all dissolved by adding HCl to the resulting fermentation liquor, cell bodies were removed off by centrifugation. Sulfuric acid was dropwise added to the resulted supernatant with stirring until the excess of sulfuric acid was recognized by adding barium chloride. The thus obtained liquor was heated at 100° C. for 30 minutes and subsequently concentrated at about 50 to 60° C. under reduced pressure. After removing off the precipitates of calcium sulfate by filtration, the filtrate was left in a cold room, whereby 1.4 g. of anhydrous citric acid was obtained.

EXAMPLE 2

The same seed culture liquor of *Candida guilliermondii* subsp. *galactosa* No. 610 (ATCC 20296) as in Example 1 was inoculated into a 500 ml. Sakaguchi flask containing 50 ml. of an aqueous nutrient medium containing 3.3% (v./v.) n-paraffin (a mixture of $C_{12}$, $C_{13}$ and $C_{14}$ paraffins in equal volumes), 0.3% $NH_4Cl$, 0.05% $KH_2PO_4$, 0.02% $MgSO_4 \cdot 7H_2O$, 0.001% $FeSO_4 \cdot 7H_2O$, 500 γ/l. of $MnSO_4 \cdot 4H_2O$, 500 γ/l. of $CuSO_4 \cdot 5H_2O$, 0.05% corn steep liquor and 4% $CaCO_3$ and having a pH of 6.0. Culturing was carried out for 4 days with aerobic shaking in the same manner as in Example 1, whereby 38 mg./ml. of calcium citrate calculated as citric acid was formed in the resulting culture liquor. In that case, almost no formation of the corresponding salt of isocitric acid was observed. In the same manner as in Example 1, 1.3 g. of anhydrous citric acid was obtained.

EXAMPLE 3

The same seed culture liquor of *Candida guilliermondii* subsp. *galactosa* No. 610 (ATCC 20296) as in Example 1 was inoculated into a 500 ml. Sakaguchi flask containing 50 ml. of an aqueous nutrient medium containing 0.4% $NH_4Cl$, 0.05% $KH_2PO_4$, 0.05% $MgSO_4 \cdot 7H_2O$, 0.1% yeast extract, 4% (v./v.) n-hexadecane, 0.01% $CaCl_2 \cdot 2H_2O$ and 0.001% Bromocresol Green. Culturing was carried out at 28° C. for 8 days with aerobic shaking. During the culturing, 5% calcium hydroxide solution was added to keep the green color of the medium and thereby the pH of the culturing system was controlled. As a result, 62.4 mg./ml. of calcium citrate calculated as citric acid was formed in the resulted culture liquor.

While the novel principles of the invention have been described, it will be understood that various omissions, modifications and changes in these principles may be made by one skilled in the art without departing from the spirit and scope of the invention.

What is claimed is:

1. A process for producing citric acid by fermentation, which comprises culturing a citric acid-producing microorganism belonging to *Candida guilliermondii* subsp. *galactosa* No. 610 (ATCC 20296) in an aqueous nutrient medium containing a carbon source, and recovering citric acid from the resulting culture liquor.

2. The process of claim 1, wherein the medium includes at least one hydrocarbon as the carbon source.

3. The process of claim 2, wherein the hydrocarbon is an equal mixture of $C_{12}$, $C_{13}$, and $C_{14}$ normal paraffins.

4. The process of claim 1, wherein an alkaline salt of citric acid is initially recovered from the resulting culture liquor.

5. The process of claim 4, wherein the alkaline salt of citric acid is calcium citrate.

6. The process of claim 1, wherein culturing is conducted under aerobic conditions at a pH of from about 1.0 to about 9.0, and at a temperature of from about 20 to 40° C.

7. The process of claim 1, wherein the pH is about 6 and the temperature is about 30° C.

8. The process of claim 1, wherein the medium contains at least one carbohydrate as the carbon source.

9. A process for producing citric acid which comprises culturing *Candida guilliermondii* subsp. *galactosa* No. 610 (ATCC 20296) under aerobic conditions at temperatures of about 20° C. to about 40° C. and a pH of about 6 in an aqueous nutrient medium containing an alkaline pH regulator; accumulating a salt of citric acid in the resultant culture liquor and recovering citric acid therefrom.

References Cited
UNITED STATES PATENTS 3,689,359   9/1972   Fukuda et al. _____ 195—28 R

FOREIGN PATENTS 1,211,246   11/1970   Great Britain.

A. LOUIS MONACELL, Primary Examiner

R. B. PENLAND, Assistant Examiner